US009061555B2

(12) United States Patent
Mallett et al.

(10) Patent No.: US 9,061,555 B2
(45) Date of Patent: Jun. 23, 2015

(54) METHOD AND MACHINE FOR AUTOMATED TIRE AND WHEEL ASSEMBLY (71) Applicant: Dominion Technologies Group, Inc., Roseville, MI (US)

(72) Inventors: Steven Mallett, Shelby Township, MI (US); Mark Materne, Sterling Heights, MI (US)

(73) Assignee: DOMINION TECHNOLOGIES GROUP, INC., Roseville, MI (US)

( * ) Notice: Subject to any disclaimer, the term of this patent is extended or adjusted under 35 U.S.C. 154(b) by 388 days.

(21) Appl. No.: 13/750,462

(22) Filed: Jan. 25, 2013

(65) Prior Publication Data

US 2014/0209252 A1    Jul. 31, 2014

(51) Int. Cl.
*B60C 25/05* (2006.01)

(52) U.S. Cl.
CPC ....... *B60C 25/0515* (2013.04); *Y10T 29/49494* (2015.01); *B60C 25/0572* (2013.04); *B60C 25/059* (2013.04)

(58) Field of Classification Search
CPC ............ B60C 25/0515; B60C 25/0521; B60C 25/0572; B60C 25/059; Y10T 29/49494
See application file for complete search history.

(56) References Cited

U.S. PATENT DOCUMENTS

| | | | |
|---|---|---|---|
| 6,125,904 A * | 10/2000 | Kane et al. | 157/1.24 |
| 6,234,232 B1 * | 5/2001 | Kane et al. | 157/1.24 |
| 6,877,544 B2 * | 4/2005 | Kane et al. | 157/1.24 |
| 7,654,788 B2 * | 2/2010 | Rogalla et al. | 414/739 |
| 7,699,087 B2 * | 4/2010 | Rogalla et al. | 157/1.1 |
| 8,161,650 B2 * | 4/2012 | Lawson et al. | 29/894.31 |
| 8,250,915 B1 | 8/2012 | Voeller et al. | |
| 8,387,675 B1 * | 3/2013 | Vaninger et al. | 157/1.24 |
| 8,783,326 B1 * | 7/2014 | Vaninger et al. | 157/1.24 |
| 8,973,639 B2 * | 3/2015 | Lawson et al. | 157/1.1 |
| 8,991,038 B2 * | 3/2015 | Lawson | 29/802 |
| 8,991,465 B2 * | 3/2015 | Lawson et al. | 157/1.21 |
| 8,991,466 B2 * | 3/2015 | Lawson et al. | 157/1.21 |
| 8,997,823 B2 * | 4/2015 | Lawson et al. | 157/1.21 |
| 2001/0000391 A1 | 4/2001 | Kane et al. | |
| 2001/0042601 A1 | 11/2001 | Corghi | |
| 2009/0266494 A1 | 10/2009 | Sotgiu | |
| 2013/0081765 A1 * | 4/2013 | Lawson et al. | 157/1.17 |

* cited by examiner

*Primary Examiner* — David B Thomas
(74) *Attorney, Agent, or Firm* — Harness, Dickey & Pierce, P.L.C.

(57) ABSTRACT

A programmable wheel and tire assembly machine and method of assembly is disclosed which compensates for different wheel and tire combinations, as well as dynamically manipulates the present arms during the mounting process. An upper present arm is supported in a manner to provide at least two axes of movement, the upper present arms capable of independent manipulation along/about each axis. A lower present arm is supported in a manner to provide at least one axis of movement, the lower present arm capable of manipulation in a horizontal plane. Wheel and tire data is collected and used to generate a mounting protocol for individual tire & wheel combination. Continuous position feedback of the present arms may be employed to further control movement throughout the mounting process.

20 Claims, 5 Drawing Sheets

METHOD AND MACHINE FOR AUTOMATED TIRE AND WHEEL ASSEMBLY

FIELD

The present disclosure relates to wheel and tire assembly and more particularly to a programmable machine and method for assembling a wheel and tire.

BACKGROUND

This section provides background information related to the present disclosure which may not constitute prior art.

To properly mount a tire to a wheel, the tire has to be presented and held into place so that a portion of the lower bead of the tire is pushed against the safety bead of the wheel when the starting the mounting process. This condition needs to be maintained through the mounting process. A single bead mounting process requires two revolutions by the mounting head with each revolution mounting one tire bead to the wheel. A dual bead mounting process is completed in a single revolution with both tire beads being mounted to the wheel simultaneously during this revolution.

The process of presenting the tire to the wheel with certain machinery is well known in the art. However, this process has been completed using a fixed location methodology in which all of the motions are single stroke motions with hard stopping positions. This fixed location methodology has recently encountered difficulties in tire mounting due to the introduction of new tire technology and the continuous decrease of tire aspect ratios. Thus, there is a need to provide a method and machine capable of using an adjustable location methodology for dynamic control of the present arms during the mounting process.

SUMMARY

This section provides a general summary of the present disclosure, but is not intended to be a comprehensive disclosure of the full scope of the subject matter or all of its features.

A programmable wheel and tire assembly machine and method of assembly is disclosed which is able to compensate for different wheel and tire combinations as well as to dynamically manipulate upper and lower stuffer assemblies during the mounting process. Currently these developments have yielded two methodologies. In a first embodiment, the upper stuffer assembly includes an upper present arm carried on an articulated robotic arm such that it provides six controlled axes to manipulate the upper present arm. In a second embodiment, the upper stuffer assembly includes an upper present arm carried on a drive unit having two servo-controlled axes with each axis able to independently manipulate the upper present arm. In addition, the lower stuffer assembly includes a pair of lower present arms carried on a drive unit, each arm having a single servo-controlled axis to manipulate the lower present arm in a horizontal plane and provide dynamic tire holding and positioning capabilities. Unlike conventional upper and lower stuffer assemblies, this technology is able to continuously manipulate to the upper and lower present arms to various programmed positions during the mounting process. Using a robotic arm and/or servo-controlled drivers allow for continuous position and/or force feedback of the present arm movement throughout the mounting process. In addition, wheel and tire data can be stored in memory and associated with the desired mounting protocol. In this way, the mounting protocol for each individual tire & wheel combination can be quickly and accurately recalled for programming the machine.

In practice, a programmable machine in accordance with the above-described developments includes a bed for supporting a wheel, a clamping mechanism positionable with respect to the bed for clamping the wheel onto the bed, a lower present arm positionable from a home position to a bead mount position with respect to the bed for locating and holding a tire relative to the wheel, an upper present arm positionable from a home position to a tire hold position with respect to the bed for locating and holding the tire relative to the wheel, and a mounting head moveable along a tire mounting path with respect to the bed for assembling the tire on the wheel. A machine controller is operable to recall a mounting protocol from a stored memory location based on wheel and tire data. The machine controller communicates instructions to the clamping unit, the lower stuffer assembly, the upper stuffer assembly and the mounting head, based on the mounting protocol for positioning and manipulating these components during the mounting process.

In practice, a method of assembling a wheel and tire in accordance with the above-described developments includes acquiring data for a wheel and tire combination and recalling a mounting protocol based on the data. A wheel is transferred into a mounting station and clamped into position. A tire is transferred into the mounting station and a lower present arm is positioned to locate and hold the tire relative to the wheel. An upper present arm is positioned to a tire hold down position to locate and hold the tire relative to the wheel. A mounting head is manipulated along a tire mounting path based on the mounting protocol for assembling the tire on the wheel. The lower and upper present arms are also manipulated based on the mounting protocol while the mounting head is manipulated along the tire mounting path to facilitate assembly of the tire onto the wheel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope of this disclosure to those who are skilled in the art. Specific details may be set forth to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known structures, and well-known technologies are not described in detail.

The terminology used herein is for the purpose of describing particular example embodiments only and is not intended to be limiting. As used herein, the singular forms "a," "an," and "the" may include the plural forms as well, unless the context clearly indicates otherwise. The terms "comprises," "comprising," "including," and "having," are inclusive and therefore specify the presence of recited structure(s) or step(s); for example, the stated features, integers, steps, operations, groups elements, and/or components, but do not preclude the presence or addition of additional structure(s) or step(s) thereof. The methods, steps, processes, and operations described herein are not to be construed as necessarily requiring performance in the stated or any particular order discussed or illustrated, unless specifically identified as an order of performance. It is also to be understood that additional, alternative or equivalent steps may be employed.

When structure is referred to as being "on," "engaged to," "connected to," or "coupled to" other structure, it may be directly or indirectly (i.e., via intervening structure) on, engaged, connected or coupled to the other structure. In contrast, when structure is referred to as being "directly on," "directly engaged to," "directly connected to," or "directly coupled to" the other structure, there may be no intervening structure present. Other words used to describe the relationship between elements should be interpreted in a like fashion (e.g., "between" versus "directly between," "adjacent" versus "directly adjacent"). As used herein, the term "and/or" includes any and all combinations of one or more of the associated referenced items.

Terms of degree (e.g., first, second, third) which are used herein to describe various structure or steps are not intended to be limiting. These terms are used to distinguish one structure or step from other structure or steps, and do not imply a sequence or order unless clearly indicated by the context of their usage. Thus, a first structure or step similarly may be termed a second structure or step without departing from the teachings of the example embodiments. Likewise, spatially relative terms (e.g., "inner," "outer," "beneath," "below," "lower," "above," "upper") which are used herein to describe the relative special relationship of one structure or step to other structure or step(s) may encompass orientations of the device or its operation that are different than depicted in the figures. For example, if a figure is turned over, structure described as "below" or "beneath" other structure would then be oriented "above" the other structure without materially affecting its special relationship or operation. The structure may be otherwise oriented (e.g. rotated 90 degrees or at other orientations) and the spatially relative descriptors used herein interpreted accordingly.

Figure 1:
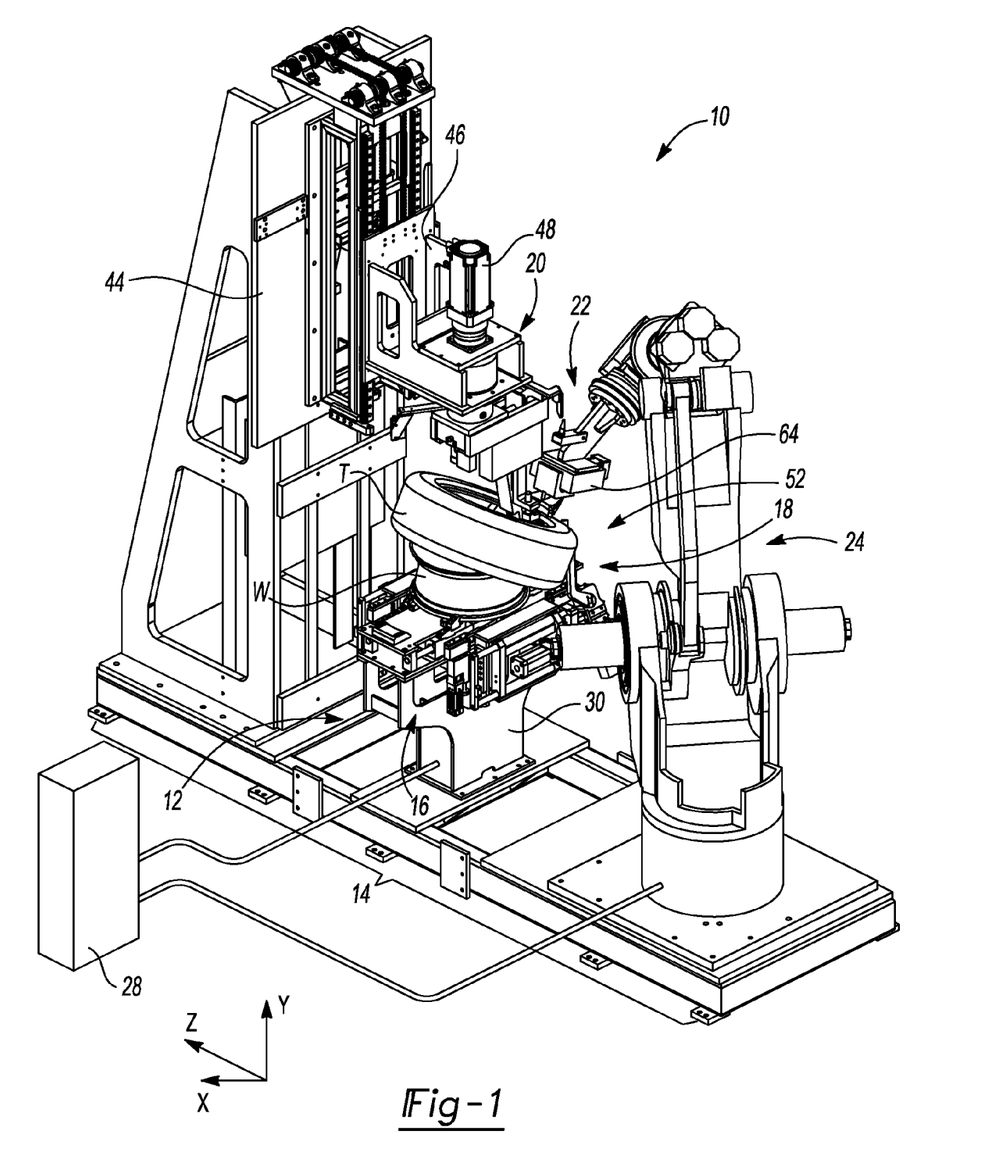
FIG. 1 illustrates a programmable machine for tire and wheel assembly.

With reference now to FIG. 1, a programmable tire presenter 10 in accordance with present disclosure is illustrated. The tire presenter 10 defines a mounting station 12 having a fixture 14, a clamping unit 16, a lower stuffer assembly 18, a mounting head 20 and an upper stuffer assembly 22. The upper stuffer assembly 22 includes a multi-axis robot 24 for manipulating an upper present arm 26 (as best seen in FIG. 2).

A programmable controller 28 is in communication with the clamping unit 16, the lower and upper stuffer assemblies 18, 22 and the mounting head 20 for providing operational control over the movement of these components. The mounting station 12 would typically include material handling machinery (not shown) located adjacent the mounting station 12 for transporting wheels W and tires T into and out of the tire presenter 10. Alternately, the wheels W and tires T could be manually transported to and from the tire presenter 10.

Figure 2:
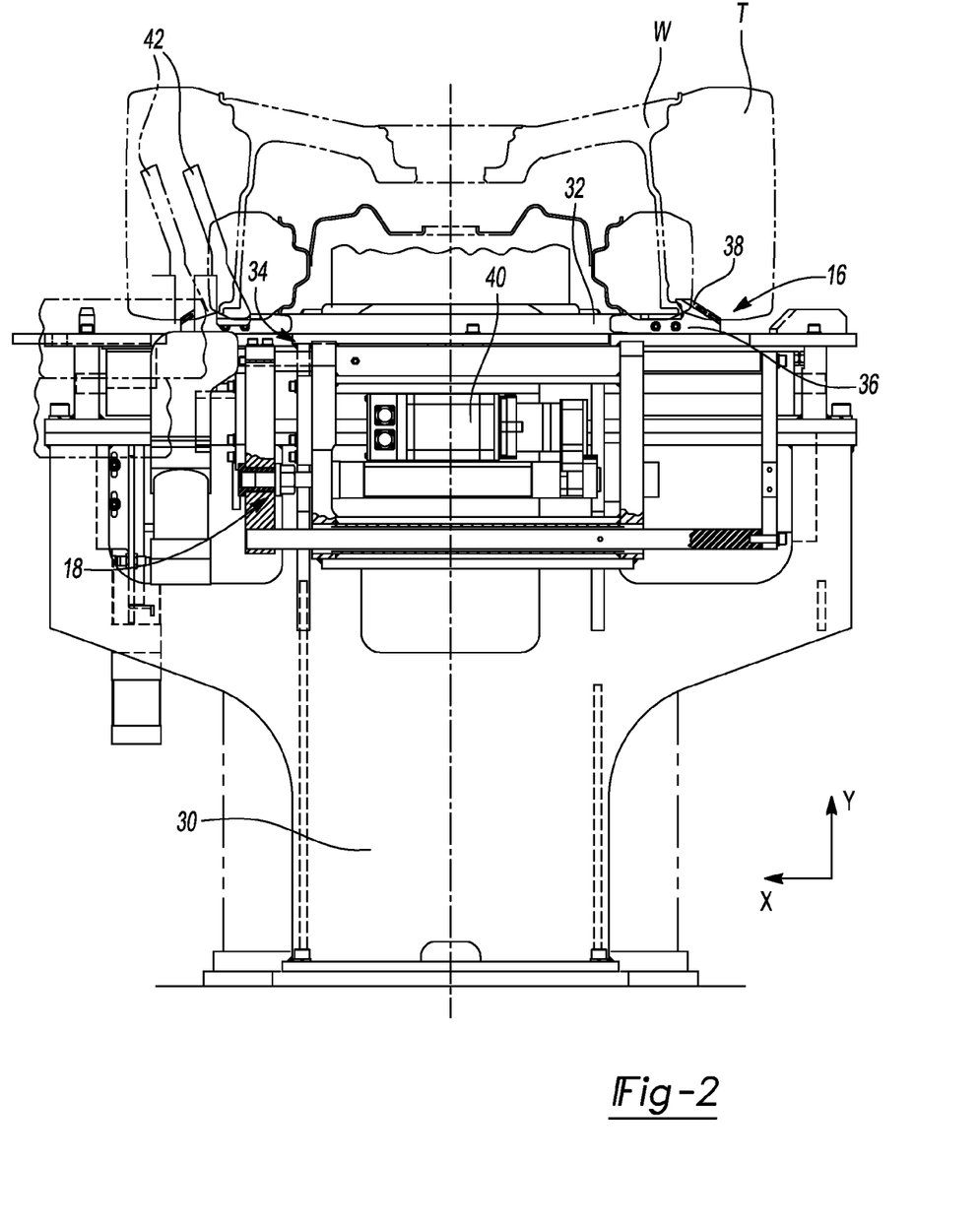
FIG. 2 illustrates a schematic cross-section of the clamping unit and lower stuffer assembly shown in FIG. 1.

With reference now to FIGS. 1 and 2, the fixture 14 includes a pedestal 30 supporting a bed 32 defining a fixed working surface. The clamping unit 16 is generally supported beneath the bed 32 and has a drive unit 34 coupled to a set of slide blocks 36. A clamping pawl 38 formed on the top of the slide block 36 extends through the bed 32 above the working surface. The drive unit 34 may take any conventional form and is operable to move the slide blocks 36 laterally inward from an unclamped position to a clamped position. With the slide blocks 36 in the clamped position, the clamping pawls 38 engage a portion of the wheel W, preferably the wheel rim, for securing the wheel W to the bed 32. In the present embodiment, the drive unit 34 has a motor-driven spur gear with a pair of gear racks, one located on each side of the spur gear. The slide blocks 36 are coupled to the racks so that rotation of the spur gear laterally moves the clamping pawls 38. While FIG. 2 shows a single clamping pawl 38 engaging the wheel W, one skilled in the art will understand that the clamping unit 16 employs multiple clamping pawls arranged in a spaced relation about the wheel.

Figure 3:
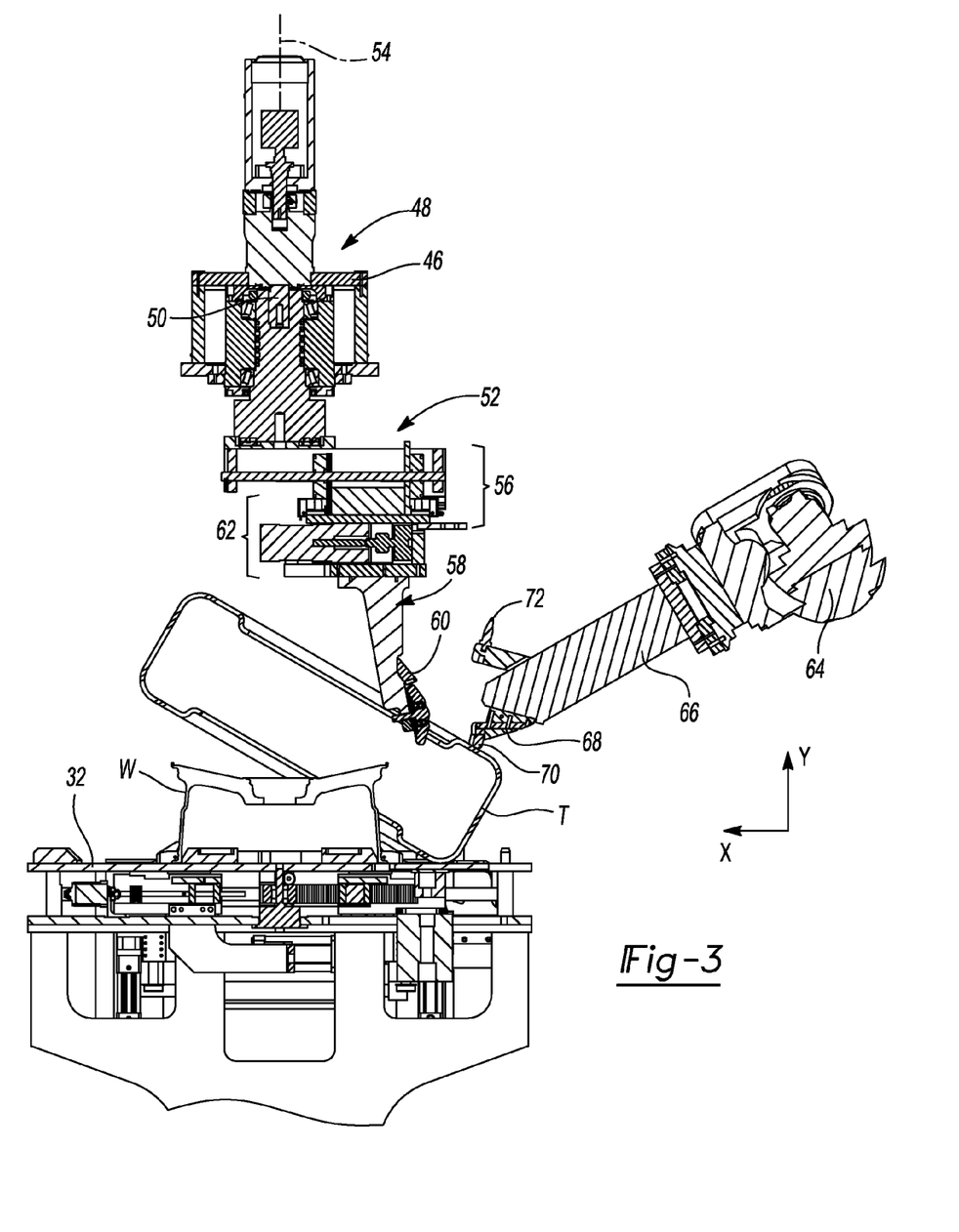
FIG. 3 illustrates a schematic cross-section of the mounting head and upper stuffer assembly shown in FIG. 1.
Figure 4:
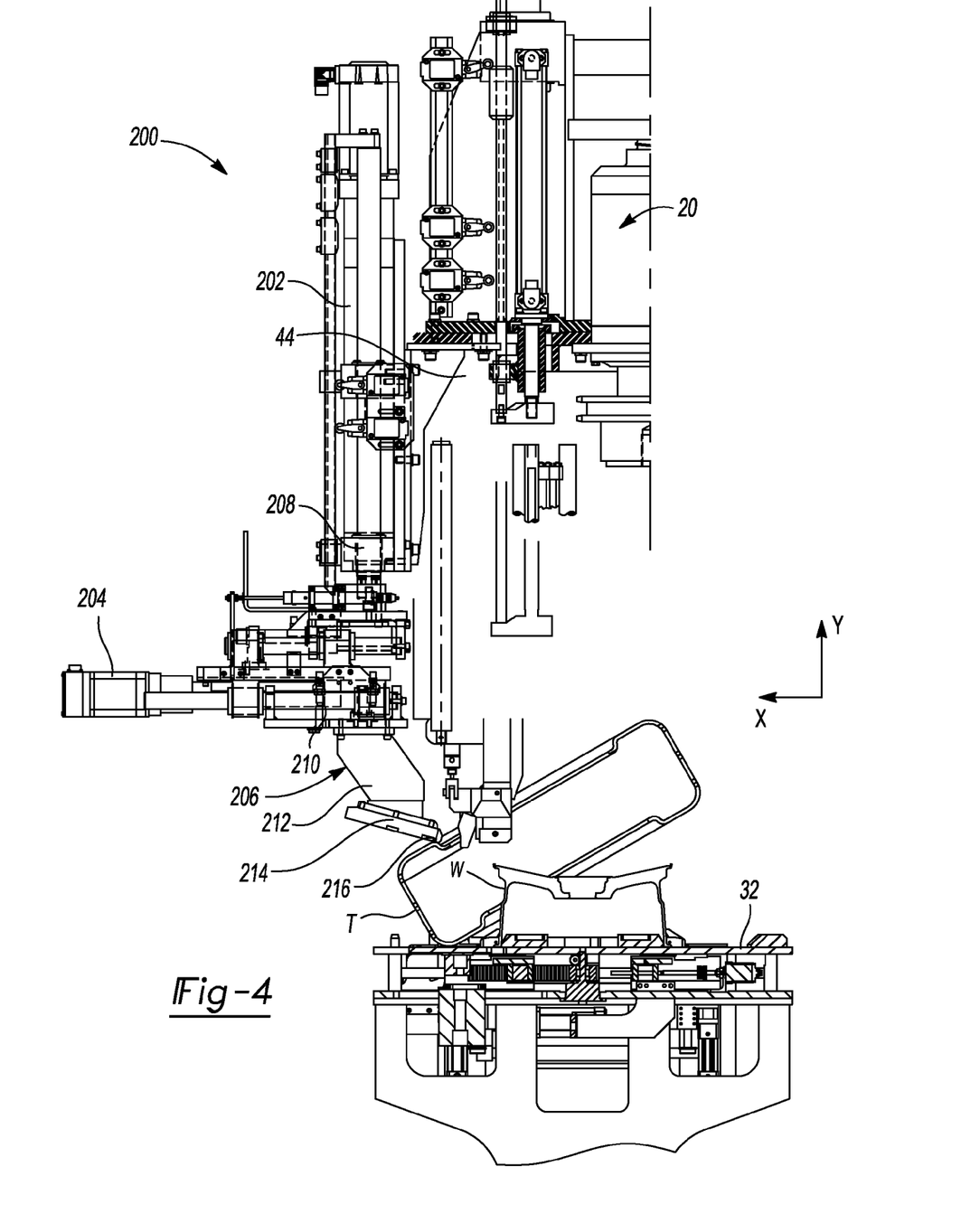
FIG. 4 illustrates a schematic cross-section of an alternate embodiment to the upper stuffer assembly shown in FIG. 1.

The lower stuffer assembly 18 is also generally supported beneath the bed 32 and has a drive unit 40 coupled to the lower present arms 42 that extend through the bed 32 above the working surface. As presently preferred, a pair of lower present arms 42 are arranged in spaced relation along the Z axis and operate independent of each other. The lower present arms 42 is angularly oriented from the vertical (Y) axis in the range of 15°-25° which generally corresponds to the angular orientation of a tread surface of the tire T (as best seen in FIGS. 3 and 4). Each lower present arm 42 is horizontally manipulated during the tire mounting process for positioning and properly orienting the tire T with respect to the wheel W. For example, the lower present arms 42 are first positioned to hold the tire so that it does not rotate relative to the wheel. Next, the lower present arms 42 are manipulated to push the tire bead into the safety bead of the wheel W. In the present embodiment, the drive unit 40 for each lower present arm 42 is a single axis servo-driven ball screw cylinder which is coupled to the lower present arm 42 and operable to manipulate the lower present arm 42 through a continuous range of positions in a lateral direction (i.e., in a direction parallel to the X axis). In addition, using servo-controlled cylinders allows for continuous position and force feedback control of the lower present arm during the wheel and tire mounting process. While FIG. 2 shows a pair of lower present arm 42 for positioning the tire T, one skilled in the art will understand that the number of lower present arms employed in the lower stuffer assembly 18 may vary.

With reference now to FIGS. 1 and 3, the fixture 14 includes a vertical weldment 44 having a carriage assembly 46 which supports the mounting head 20 generally above the bed 32. The carriage assembly 46 is slidably supported on the vertical weldment 44 for vertical positioning the mounting head 20 movement with respect to the bed 32. The mounting head 20 includes a rotary driver 48 such as a servo-motor having an output shaft 50 coupled to a bead roller assembly 52. Operation of the rotary driver 48 causes the bead roller assembly 52 to rotate about a vertical motor axis 54. In particular, the vertical motor axis 54 is aligned with the central axis of the wheel W as best seen in FIG. 3. The rotary driver 48 may incorporate a transmission or other gear reduction mechanism for adjusting the speed and torque of the bead roller assembly 52.

The bead roller assembly 52 includes a positioner 56 coupled to an end of the output shaft 50, an arm 58 extending downwardly from the positioner 56, and a bead roller 60 supported on an end of the arm 58 opposite the positioner 56. The positioner 56 slidably supports the arm 58 and for radially positioning the bead roller 60 with respect to the vertical motor axis 54. As presently preferred the positioner 56 is a slide mechanism that can be positioned radially into a desired location. A braking unit 62 is used to fix the positioner 56 in the desired location. Alternately, the positioner could employ a drive unit such as a servo-controlled ball screw cylinder for radially positioning and fixing the arm 58 and bead roller 60. The bead roller 60 is attached to a free end 76 of the arm 58 so that it may rotate freely on the arm 58.

The upper present arm 26 of upper stuffer assembly 22 is coupled to the end of a robotic arm 64 and operable to manipulate the upper present arm 26 through a continuous range of positions within the three-dimensional space around the mounting station 12. In addition, the robotic arm 64 allows for continuous position and force feedback control of the upper present arm 26 during the wheel and tire mounting process. The upper present arm 26 includes an end effector 66 secured to the faceplate of the robotic arm 64 and a tire hold down 68 attached to a free end of the end effector 66. The nose 70 of the tire hold down 68 is configured to engage the side wall of the tire T for locating and holding the tire T during assembly. For example, the upper present arm 26 is manipulated to push the top bead down into the drop center (mid-region) of the wheel W. As presently preferred, the tire hold down 68 includes a spring biased slide to compliantly support the nose 70 on the end effector 66. When viewed from above (plan view looking down the Y axis), the nose 70 has an arcuate shape that generally corresponds to the range of wheel radii to be mounted in the tire presenter 10.

A tapered pin 72 is also attached to the free end 76 of end effector 66 and extends generally away from the tire hold down 68. The tapered pin 72 may be inserted into a hole 74 formed in the positioner 56 so that the robotic arm 64 may be used for radially locating the positioner 56. With reference now to FIG. 4, an upper stuffer assembly 200 which represents an alternate embodiment of the upper stuffer assembly 22 is illustrated. Upper stuffer assembly 200 employs a set of servo-driven ball screw cylinders 202, 204 to manipulate the present arm 206 along two axes—the vertical axis (Y) and the horizontal axis (X). The upper stuffer assembly 200 is attached to the carriage assembly 44 adjacent the mounting head 20 and moves concurrently in a vertical direction on the carriage assembly 44 with the mounting head 20. The cylinder 202 is oriented in the vertical (Y) direction and has a rod 208 extending downwardly. The free end of the rod 208 is coupled to the cylinder 204 which is oriented in the horizontal (X) direction and has a rod 210 extending laterally. The upper present arm 206 includes an end effector 212 secured to the free end of the rod 210 and a tire hold down 214 attached to a free end of the end effector 212. Similar to the nose 70, nose 216 configured to engage the side wall of the tire T for locating and holding the tire T during assembly. When viewed from above (plan view looking down the Y axis), the nose 216 has an arcuate shape that generally corresponds to a range of wheel radii to be mounted in the tire presenter 10.

The upper present arm 206 is manipulated during the tire mounting process for properly positioning the upper tire bead into the drop center of the wheel W and further restricting movement of the tire T with respect to the wheel W. Cylinders 202, 204 are coupled to the upper present arm 206 and operable to manipulate the upper present arm 206 through a continuous range of positions within a plane parallel to the plane defined by the X-Y axes. In addition, using servo-controlled cylinders allows for continuous position feedback control of the upper present arm 206 during the wheel and tire mounting process.

Figure 5:
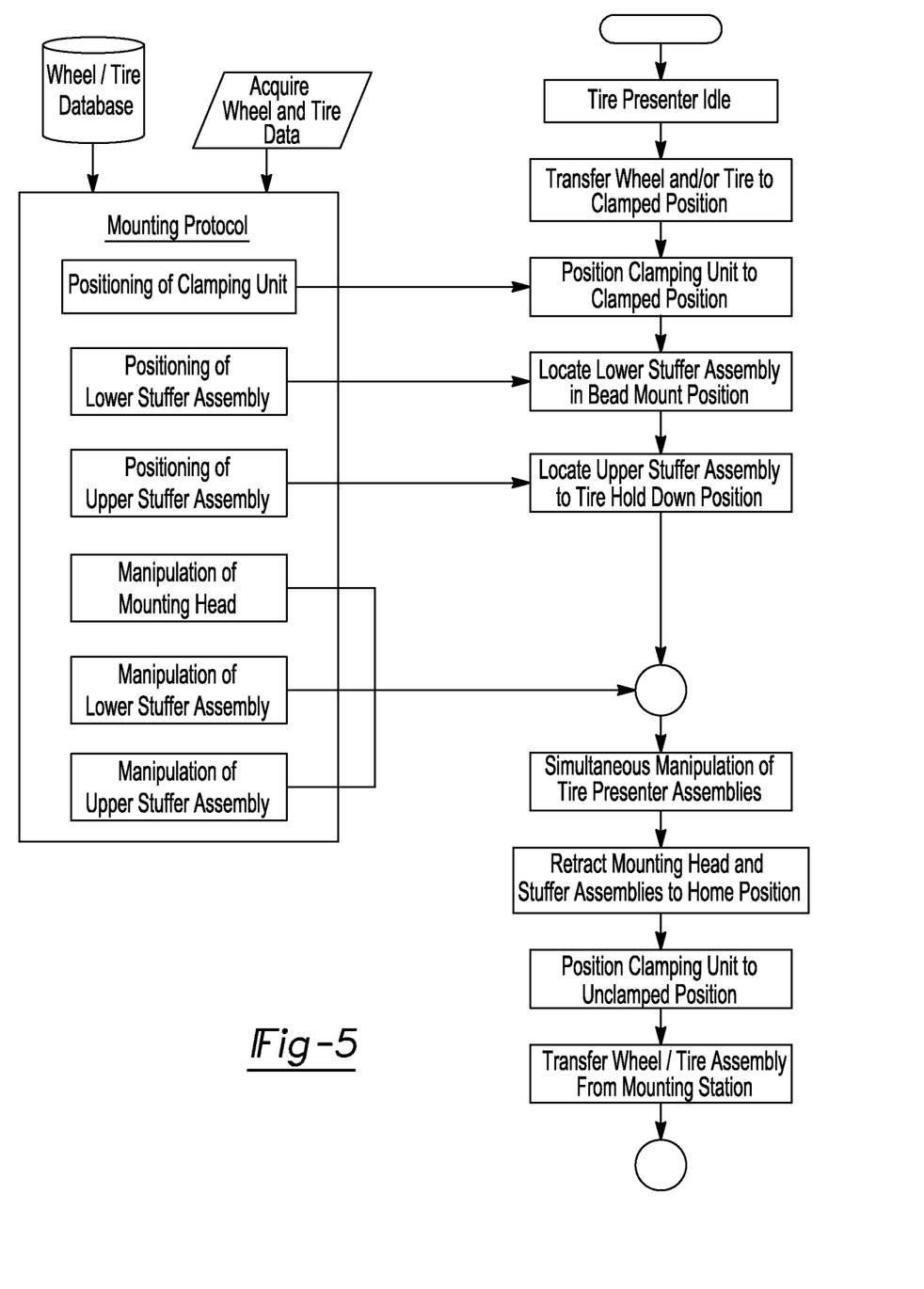
FIG. 5 is a flow-chart representing an automated method for tire and wheel assembly.

With reference now to the flowchart illustrated in FIG. 5, a wheel and tire assembly process in accordance with the present disclosure will now be described. Except as noted, the following description of the wheel and tire assembly process is made with reference to the embodiments illustrated in FIGS. 1-3.

Upon initiation the tire presenter 10 is in an idle state with the clamping pawls 38 of the clamping unit 16 in an open, unclamped position. The mounting head 20 and the lower and upper present arms 42, 26 are located away from the bed 32 in a home position. In the idle state, the tire presenter 10 is ready to receive a wheel W and tire T. Next wheel and tire data specifying the characteristics of the wheel W and tire T combination to be assembled is acquired and communicated to the controller 28. Any suitable means of data acquisition may be used, for example, data scan technology which reads wheel and tire data directly from the wheel W and tire T or from manufacturing labels on the wheel W and tire T, or from data communicated from a factory information system, or direct input of wheel and tire data by an operator.

The controller 28 uses the wheel and tire data to generate a mounting protocol which includes specific instructions for positioning and manipulating the components of the tire presenter 10 during the assembly process. The mounting protocol may be generated by the controller 28 through a data look-up function in which identifications for various wheels W and tires T are cross-referenced in a look-up table with a specific pre-defined mounting protocol stored in memory. The look-up function uses particular wheel and tire data to recall a mounting protocol for that particular combination of wheel W and tire T. The mounting protocol may also be generated by the controller through a data processing routine if the wheel and tire data provides adequate information such that the controller 28 can compute a suitable mounting protocol. In this sense, the mounting protocol includes a set of instructions used to program the tire presenter 10 and provide an automated method for tire and wheel assembly.

A wheel W or a wheel W and tire T combination is transferred into the mounting station 12 and generally located on the bed 32. Once generally located, the clamping unit 16 positions the clamping pawls 38 from the unclamped position to a clamped position. In the clamped position, the clamping pawls 38 secure the wheel W in a fixed and predetermined location with respect to the mounting station 12. The mounting protocol may instruct the clamping unit to perform this function. If not already loaded, a tire T is transferred into the mounting station 12 and generally located on the wheel W. Once generally located, the lower stuffer assembly 18 to hold the tire T and position the lower present arm 42 from the home position to a bead mount position. In the bead mount position, the lower present arms 42 locate the tire T in a predetermined location with respect to the mounting station 12 such that the lower bead engages the safety bead on the wheel W. The mounting protocol may instruct the lower stuffer assembly 18 to perform this function.

With particular reference to FIGS. 1 and 3, once the wheel W and tire T are positioned at a known location in the mounting station 12, the robotic arm 64 positions the upper present arms 26 from the home position to a tire hold down position. In the tire hold down position, the nose 70 of the tire hold down 68 engages a sidewall of the tire T to move the upper bead into the drop center of the wheel, and further restricts movement of the tire T. The mounting protocol may instruct the upper stuffer assembly 22 to perform this function. With the upper present arms 26 in the tier hold down position, the mounting protocol instructs the carriage assembly 46 and mounting head 20 to position the bead roller 60 into engagement with the tire T. Once so engaged, the mounting protocol instructs the rotary driver 48 and the radial positioner 56 to manipulate the arm 58 and the bead roller 60 about the circumference of the wheel W, thereby moving the bead of the tire T into position between the rims of the wheel W.

Simultaneous with the manipulation of the bead roller 60, the mounting protocol may instruct the upper present arm 26 to manipulate the tire hold down 68 away from the tire hold down position along a tire mounting path. For example, the upper present arm 26 may be manipulated to move the tire hold down 68 vertically (up or down) parallel to the central axis of the wheel W. Similarly, the upper present arm 26 may be manipulated in a plane parallel to the bed 32 (i.e., parallel to a plane defined by the X-Z axes). Movement in the X-Z plane allows the tire hold down 68 to be positioned radially (inward or outward) of the central axis of the wheel W and/or to be positioned circumferentially about the rim of the wheel W. As such, the mounting protocol can instruct the upper present arm 26 to move through a continuous range of motion in three dimensions during the tire mounting process.

With particular reference to the embodiment illustrated in FIG. 4, once the wheel W and tire T are positioned at a known location in the mounting station 12, the upper stuffer assembly 200, and in particular the drive cylinders 202, 204 positions the upper present arms 206 from the home position to a tire hold down position. In the tire hold down position, the nose 216 of the tire hold down 214 engages a sidewall of the tire T to position the upper bead into the drop center of the wheel W, and further restricts movement of the tire T. The mounting protocol may instruct the upper stuffer assembly 22 to perform this function. With the upper present arm 206 in the tier hold down position, the mounting protocol instructs the carriage assembly 46 and mounting head 20 to position the bead roller 60 into engagement with the tire T. Once so engaged, the mounting protocol instructs the rotary driver 48 and the radial positioner 56 to manipulate the arm 58 and the bead roller 60 about the circumference of the wheel W, thereby moving the bead of the tire into position between the rims of the wheel W.

Simultaneous with the manipulation of the bead roller 60, the mounting protocol may instruct the upper stuffer assembly 200 to manipulate the upper present arm 206 away from the tire hold down position along a tire mounting path. For example, the upper present arm 206 may be manipulated to move the tire hold down 68 parallel to the Z axis (i.e. vertically up or down) or parallel to the X axis (i.e., horizontally left or right) such that the nose 208 can to be positioned radially (inward or outward) of the central axis of the wheel W. As such, the mounting protocol can instruct the upper present arm 206 to move through a continuous range of motion in two dimensions during the tire mounting process.

Returning to the general assembly method, the mounting protocol may also instruct the lower stuffer assembly 18 to manipulate the lower present arm 42 away from the bead mount position along a tire mounting path simultaneous with the manipulation of the bead roller 60. For example, the lower present arm 42 may be manipulated to move parallel to the X axis (i.e., horizontally left or right) and thus radially (inward or outward) of the central axis of the wheel W. As such, the mounting protocol can instruct the lower present arm 42 to move through a continuous range of motion in one dimension during the tire mounting process.

Simultaneous manipulation of the lower stuffer assembly 18 and/or the upper stuffer assembly 22 during the tire mounting process eliminates the fixed stop constraints of conventional system and enables continuous adjustment for the position of the wheels W and tires T and improved holding capabilities. Moreover, the use of a robotic arm and servo-controlled cylinders enables position and/or force feedback control to further improve the accuracy of the instructions provided by the mounting protocol and to increase efficiency of the mounting process.

The mounting protocol may instruct the mounting head 20 to make a single revolution around the circumference of the wheel W during a dual bead mounting process such that both beads of a tire T are mounted onto the wheel W to form a tire and wheel assembly. Alternately, the mounting protocol may instruct the mounting head 20 to make two revolutions around the circumference of the wheel W during a single bead mounting process such that one bead of the tire T is mounted onto the wheel W with each pass to form the tire and wheel assembly. With the tire and wheel assembly complete, the mounting protocol instructs the mounting head 20 and the lower and upper stuffer assemblies 18, 22 to be positioned back to the home position. The mounting protocol then instructs the clamping unit 16 to move the clamping pawls 38 from the clamped position to the unclamped position to release the tire and wheel assembly. The tire and wheel assembly may be transferred out of the mounting station 12 by any suitable means as previously described. The tire presenter 10 is once again in an idle state and prepared to repeat the assembly process.

An assembly process in accordance with the present disclosure may acquire wheel and tire data at any point in time prior to initiation of the assembly process. In other words, the wheel and tire data need not be acquired before the wheel W and/or tire T is transported to the mounting station 12, but may be captured once the mounting station is loaded. Similarly, the assembly process does not require that wheel and tire data be acquired for each and every assembly sequence, but may be acquired in a batch manner such that wheel and tire data is acquired once for a batch or lot of assemblies when an identical combination of wheels W and tires T is involved.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An automated method for tire and wheel assembly comprising:
   acquiring wheel and tire data;
   generating a mounting protocol based on the wheel and tire data;
   transferring a wheel into a mounting station;
   positioning a clamp from an unclamped position to a clamped position for securing the wheel in the mounting station;

transferring a tire into the mounting station;
positioning a lower present arm from a home position to a bead mount position for locating the tire relative to the wheel;
positioning an upper present arm from a home position to a tire hold down position for restricting movement of the tire relative to the wheel;
manipulating a mounting head along a tire mounting path based on the mounting protocol for assembling the tire on the wheel; and
manipulating at least one of the upper present arm and the lower present arm based on the mounting protocol while the mounting head is manipulated along the tire mounting path.

2. The automated method of claim 1 wherein the upper present arm is operably supported on a positioner which manipulates the upper present arm in 2-axes relative to the wheel based on the mounting protocol.

3. The automated method of claim 2 wherein manipulating the upper present arm comprises manipulating the upper present arm in a radial direction and a vertical direction with respect to the wheel.

4. The automated method of claim 1 wherein the upper present arm is operably supported on an end effector of a robotic arm such that the robotic arm manipulates the upper present arm based on the mounting protocol.

5. The automated method of claim 1 further comprising manipulating the upper present arm based on a feedback signal representing the current position of the upper present arm.

6. The automated method of claim 1 wherein positioning the upper present arm to the tire hold down position is based on the mounting protocol.

7. The automated method of claim 1 wherein positioning the lower present arm to the bead mount position is based on the mounting protocol.

8. The automated method of claim 7 further comprising manipulating both the upper present arm and the lower present arm based on the mounting protocol while the mounting head is manipulated along the tire mounting path.

9. The automated method of claim 8 wherein manipulating the lower present arm comprises positioning the lower present arm in a radial direction with respect to the wheel.

10. The automated method of claim 8 further comprising manipulating the lower present arm based on a feedback signal representing the current position of the lower present arm.

11. The automated method of claim 1 further comprising:
retracting the mounting head and the upper and lower present arms away from the tire and wheel assembly to the home positions;
positioning the clamp to the unclamped position for releasing the tire and wheel assembly from the mounting station; and
transferring the tire and wheel assembly out of the mounting station.

12. A programmable machine for tire and wheel assembly comprising:
a bed for supporting a wheel;
a clamping mechanism positionable with respect to the bed for clamping the wheel onto the bed;
a lower present arm positionable from a home position to a fixed position with respect to the bed for locating a tire relative to the wheel;
an upper present arm positionable from a home position to a fixed position with respect to the bed for restricting movement of the tire relative to the wheel;
a mounting head moveable along a tire mounting path with respect to the bed for assembling the tire on the wheel;
a controller operable to recall a mounting protocol from a stored memory location based on wheel and tire data, the controller operable to send a first instruction set to the mounting head based on the mounting protocol and a second instruction set to at least one of the upper present arm and the lower present arm based on the mounting protocol such that the at least one present arm is manipulated about its fixed position while the mounting head is manipulated along the tire mounting path.

13. The programmable machine of claim 12 further comprising a positioner operably supporting the upper present arm such that the positioner manipulates the upper present arm about its fixed position in 2-axes relative to the bed based on the mounting protocol.

14. The programmable machine of claim 12 further comprises:
a first servo-driven ball screw cylinder positioning the upper present arm in a vertical direction; and
a second servo-driven ball screw cylinder positioning the upper present arm in a horizontal direction.

15. The programmable machine of claim 12 wherein the upper present arm is operably supported on an end effector of a robotic arm such that the robotic arm manipulates the upper present arm based on the mounting protocol.

16. The programmable machine of claim 12 wherein the controller further comprises a feedback control circuit to send a feedback control signal, wherein the second instruction set is based on the mounting protocol and the feedback control signal.

17. The programmable machine of claim 12 further comprising a positioner operably supporting the lower present arm for manipulating the lower present arm about the fixed position.

18. The programmable machine of claim 17 wherein the positioner comprises a servo-driven ball screw cylinder positioning the lower present arm.

19. The programmable machine of claim 17 wherein the controller is further operable to send a third instruction set to the lower present arm based on the mounting protocol such that the lower arm is manipulated while the mounting head is manipulated along the tire mounting path.

20. The programmable machine of claim 19 wherein the controller further comprises a feedback control circuit to send a feedback control signal, wherein the third instruction set is based on the mounting protocol and the feedback control signal.

* * * * *